United States Patent Office 2,811,552
Patented Oct. 29, 1957

2,811,552

PROCESS FOR THE CATALYTIC OXIDATION OF ACETONE

André Pacoud and Pierre Roland, St-Fons, France, assignors to Societe des Usines Chimiques Rhone-Poulenc, Paris, France, a French body corporate No Drawing. Application January 4, 1955,
Serial No. 479,862

Claims priority, application Great Britain
January 14, 1954

6 Claims. (Cl. 260—541)

This invention relates to the catalytic oxidation of acetone.

In the specification of co-pending application Serial No. 428,385 there is described a process in which, in contradistinction to the known processes, the reaction is effected under conditions, including that of temperature, such that escape of volatile reaction products from the reaction zone is at least unhindered and is preferably assisted by passage of gas under pressure upwardly through the reaction mixture. The gas may consist of relatively pure oxygen or oxygen diluted with one or more inert gases, e. g. in the form of air or air supplemented by an additional quantity of nitrogen.

In one embodiment of the said process, molecular oxygen and acetone are introduced into a liquid medium, consisting wholly or mainly of acetic acid, and containing the catalyst which is preferably a salt of manganese, said medium being heated to provide a reaction temperature of or equivalent to at least 65° C. at normal pressure. Elimination of the products of the reaction as they are formed and recovery of those required is conveniently achieved by effecting the reaction in a column or like reaction vessel equipped with controllable heating means and connected to a separate (non-reflux) condenser, in which the condensate is collected.

It is the object of the present invention to provide an improvement in or modification of the process of the aforesaid prior specification.

According to the present invention, a process for the oxidation of acetone in the liquid phase at elevated temperature in the manner claimed in the specification of the aforesaid co-pending application is characterised in that the oxidation is effected in the presence of an organic diluent other than the substances formed during the oxidation (which does not react under the operating conditions with any of the substances present in the reaction). Preferably, said organic diluent is employed in association with acetic acid.

The said diluent may have a higher or lower boiling point than acetic acid. In the case of a diluent having a higher boiling point, a substance is preferably chosen which has low vapour tension at the oxidation temperature employed, in order that it may not be eliminated with the products of oxidation. In this case, it is sufficient to introduce the total quantity of diluent to be used at the beginning of the reaction. In addition, it must be liquid at the oxidation temperature employed and must have a sufficiently low viscosity at that temperature to permit the intimate mixing of the reaction medium with the oxygen or oxygen-containing gas.

When diluents having a lower boiling point than acetic acid are employed, they are carried away with the products of oxidation and should be introduced into the reaction apparatus simultaneously with the acetone, and, when it is used as addition, the acetic acid.

Substances in the first category, i. e., having a boiling point higher than acetic acid, include, for example, di-methylphthalate and high-boiling hydrocarbons. Substances in the second category, i. e. having a boiling point lower than acetic acid, include, for example, low-boiling hydrocarbons e. g. cyclohexane, esters e. g. isopropyl acetate, and ethers e. g. isopropyl ether.

The present invention is illustrated by the following examples.

*Example I*

Into an apparatus similar to that described in Example I of the specification of copending application Serial No. 428,385 are introduced 240 g. of acetic acid, 175 g. of acetone, 180 g. of di-methylphthalate and 7 g. of $Mn(NO_3)_2.6H_2O$. The mixture is heated to 90° C. and a current of oxygen is then passed through the mixture from the bottom at the rate of 73 liters per hour, while 712 g. per hour of acetone and 62 g. per hour of acetic acid are run in from the top. After 6¼ hours operation, there is obtained, after allowing for the quantities of acetic acid introduced and unconverted acetone:

Acetic acid ___ 462 g. i. e. 7.7 g. mol.
Formic acid ___ 164 g. i. e. 3.56 g. mol.⎱ 7.09 g. mol.
Formaldehyde _ 106 g. i. e. 3.53 g. mol.⎰

Analysis of the outlet gases shows:

$CO_2$ _____ 19.2 g. i. e. 0.435 g. mol.⎱ 0.62 g. mol.
CO _____ 5.2 g. i. e. 0.185 g. mol.⎰ for an acetone consumption of 451 g., i. e. 7.8 g. mol.

The yield on the first two carbon atoms of the acetone giving acetic acid is therefore 98.5%, while the total of formic acid and formaldehyde yield on the last carbon atom is 91%. The losses due to formation of $CO_2$ and CO are only 8%. The molecular ratio of formaldehyde to formic acid is 0.99:1.

*Example II*

Into a reaction apparatus identical to that of Example I are introduced 200 g. of acetic acid, 100 g. of acetone, 250 g. of an isoparaffinic hydrocarbon fraction boiling between 345° and 473° C. and having a viscosity of 50 centistokes at 20° C. and 4 centistokes at 90° C., and 7 g. of $Mn(NO_3)_2.6H_2O$. The mixture is heated to 90° C., a current of oxygen is then passed through the mixture from the bottom at the rate of 73 litres per hour and 518 g. per hour of acetone and 91 g. per hour of acetic acid simultaneously run in from the top. After operating for 6 hours 40 minues and after allowing for the quantities of acetic acid introduced and unconverted acetone, there is obtained:

Acetic acid ____ 411 g. i. e. 6.85 g. mol.
Formic acid ___ 135 g. i. e. 2.9 g. mol. ⎱ 6.6 g. mol.
Formaldehyde __ 113.2 g. i. e. 3.7 g. mol.⎰

Analysis of the outlet gases shows:

$CO_2$ _____ 20 g. i. e. 0.45 g. mol.
CO _____ 5.4 g. i. e. 0.19 g. mol.

for a consumption of acetone of 413 g., i. e. 7.1 g. mol.

The yields are therefore:

98.7% of acetic acid
40.8% of formic acid ⎱ 92.8%
52% of formaldehyde ⎰ while the losses due to $CO_2$ and CO are only 9%. The molecular ratio of formaldehyde to formic acid is 1.27:1.

*Example III*

Into the reaction apparatus used in the preceding examples are introduced 450 g. of acetic acid, 140 cc. of acetone, 60 cc. of cyclohexane and 7 g. of $Mn(NO_3)_2.6H_2O$ The mixture is heated to 90° C. and 73 litres of oxygen per hour are then passed through the mixture from the bottom while 503 g. of acetone per hour, 215.5 g. per hour of cyclohexane and 150 g. per hour of acetic acid are run in from the top. After operating for eight hours there is obtained, making allowances for the initial amount of acetic acid and unconverted acetone:

| | |
|---|---|
| Acetic acid | 600 g. i. e. 10 g. mol. |
| Formic acid | 243 g. i. e. 5.28 g. mol. |
| Formaldehyde | 127.6 g. i. e. 4.25 g. mol. |
| $CO_2$ | 16.2 g. i. e. 0.37 g. mol. |
| CO | 10 g. i. e. 0.21 g. mol. | for a consumption of acetone of 590 g., i. e. 10.2 g. mol.

The yields are therefore:

98% of acetic acid  
51.8% of formic acid   } 93.3%  
41.5% of formaldehyde while the losses due to $CO_2$ and CO are 5.7%. The molecular ratio of formaldehyde to formic acid is 0.8:1.

By the term "inert organic liquid diluent" is meant an organic liquid diluent which does not react with any substance present or formed in the reaction.

We claim:

1. Process for continuous simultaneous production of acetic acid, formaldehyde, and formic acid, by controlled catalytic oxidation of acetone in a liquid reaction medium containing an oxidation catalyst, acetic acid and an inert organic diluent different from and additional to compounds present and formed in the reaction, that comprises continuously charging acetone into said medium in a reaction zone maintained at a reaction temperature of at least 65° C. and at most the temperature at which acetic acid boils, continuously passing an oxygen-containing gas into said medium, continuously removing a gaseous effluent from the reaction zone, and continuously separating from said effluent acetic acid, formaldehyde and formic acid, said diluent being liquid at the reaction temperature.

2. Process as defined in claim 1 further characterized in that the inert organic diluent is a substance having a lower boiling point than acetic acid selected from the group consisting of low-boiling hydrocarbons, low-boiling esters, and low-boiling ethers, and it is added continuously to the reaction medium with the acetone to maintain the level of the reaction constant.

3. Process as defined in claim 1 further characterized in that the inert organic diluent is a substance having a higher boiling point than acetic acid selected from the group consisting of dimethyl phthalate and high-boiling hydrocarbons.

4. Process as defined in claim 3 further characterized in that the inert organic diluent is dimethyl phthalate.

5. Process as defined in claim 3 further characterized in that the inert organic diluent is an iso-paraffinic hydrocarbon fraction boiling between 345° C. and 473° C. and having a viscosity of 50 centistokes at 20° C. and 4 centistokes at 90° C.

6. Process as defined in claim 2 further characterized in that the inert organic diluent is cyclohexane.

References Cited in the file of this patent

UNITED STATES PATENTS

| | | |
|---|---|---|
| 2,005,183 | Flemming et al. | Jan. 18, 1935 |
| 2,270,252 | Bludworth | Jan. 20, 1942 |